April 8, 1924.
J. O. REYNOLDS
1,490,025
HACK SAW
Filed Nov. 10, 1922
2 Sheets-Sheet 2
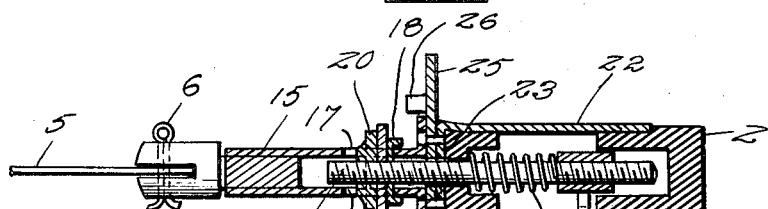
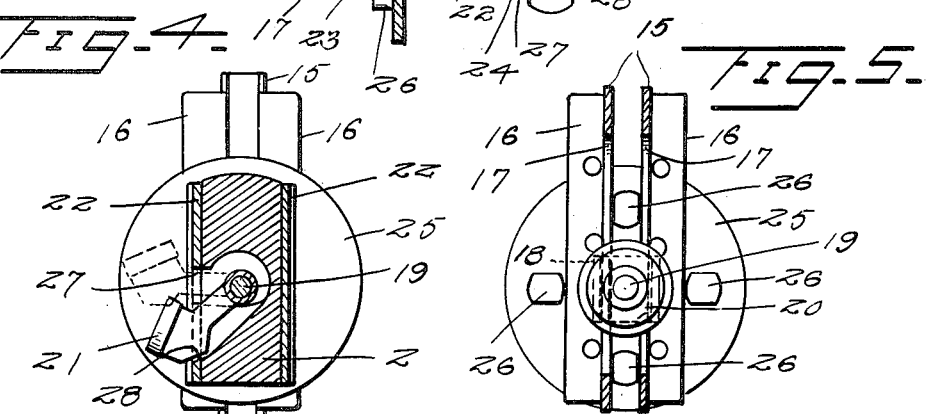
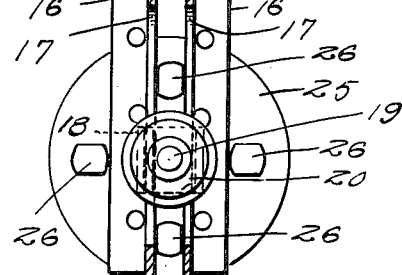
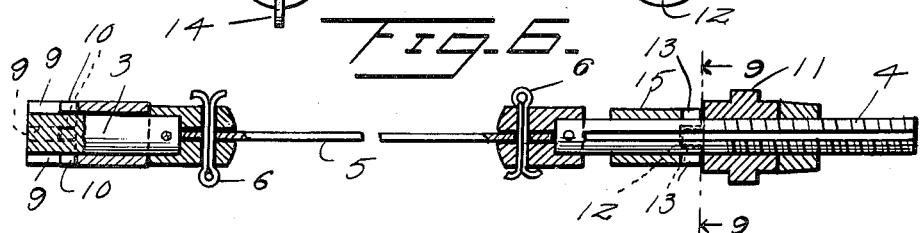
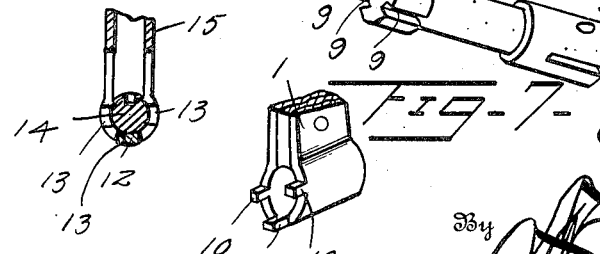
Inventor
J. O. Reynolds.

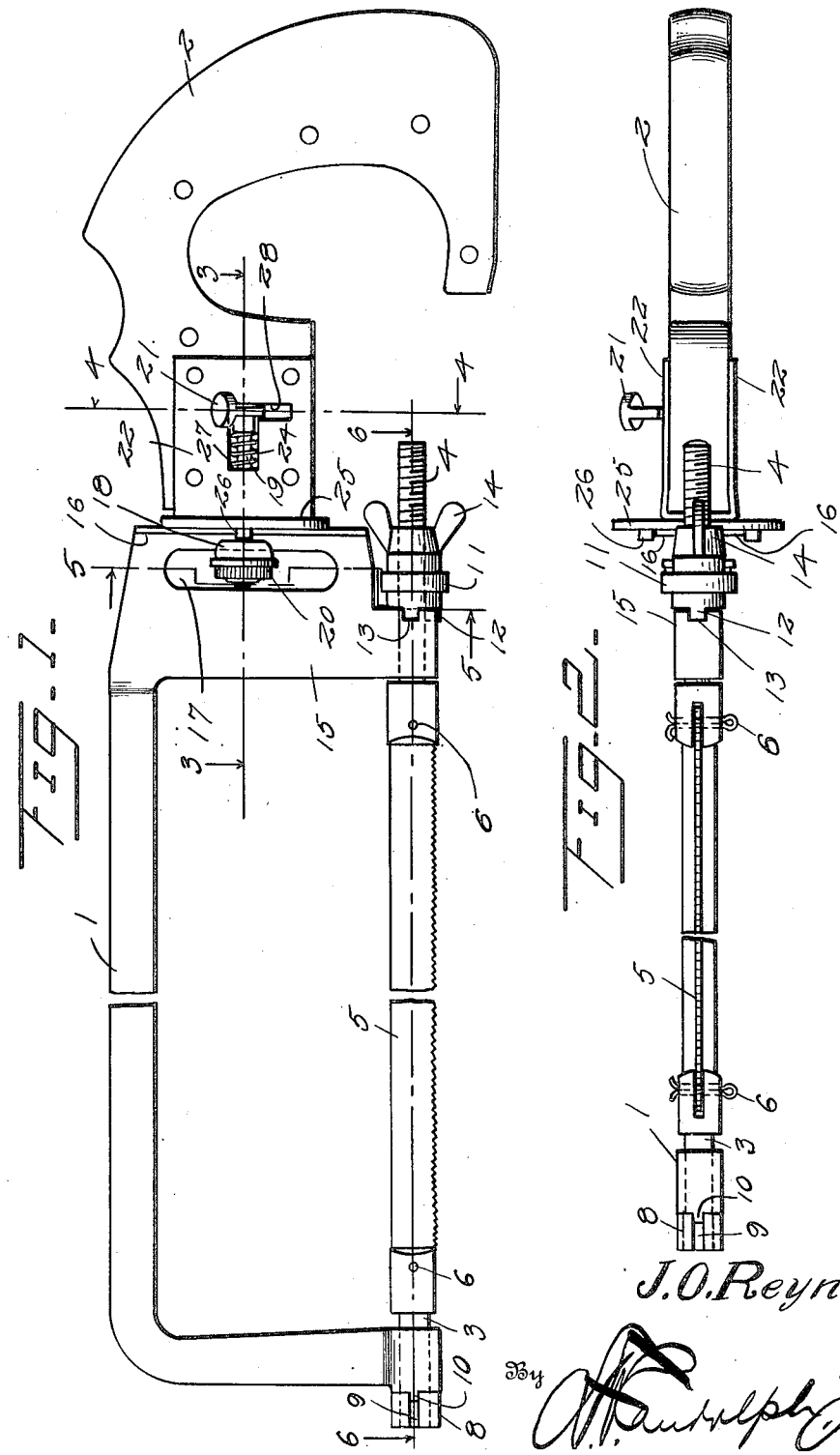

Patented Apr. 8, 1924.

1,490,025

UNITED STATES PATENT OFFICE.

JAMES O. REYNOLDS, OF GRANITE CITY, ILLINOIS.

HACK SAW.

Application filed November 10, 1922. Serial No. 600,199.

*To all whom it may concern:*

Be it known that I, JAMES O. REYNOLDS, a citizen of the United States, residing at Granite City, in the county of Madison and State of Illinois, have invented certain new and useful Improvements in a Hack Saw; and I do hereby declare the following to be a full, clear, and exact description of the invention, such as will enable others skilled in the art to which it appertains to make and use the same.

The invention relates to hack saws for cutting metal and has for its object to provide a metal cutting saw in which the blade may be adjusted to a variety of angles with reference to the frame and in which the handle may be adjusted angularly and nearer to or farther from the line of the blade as may best suit the nature of the work in hand.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a side view of a hack saw embodying the invention, the intermediate portion of the frame and saw blade being broken away, Figure 2 is a view of the parts illustrated in Figure 1 as seen from the lower or cutting edge, Figure 3 is a horizontal section on the line 3—3 of Figure 1, Figure 4 is a vertical section on the line 4—4 of Figure 1, Figures 5 and 6 are sectional views on the lines 5—5 and 6—6 of Figure 1, looking in the direction indicated by the arrows, Figure 7 is a perspective view of the outer end portion of the saw frame, Figure 8 is a perspective view of the outer saw stem, and Figure 9 is a detail sectional view on the line 9—9 of Figure 6.

Corresponding and like parts are referred to in the following description and designated in the several views of the drawings by like reference characters.

The numeral 1 designates the saw frame which is of usual outline in the construction of hack or metal cutting saws. A handle 2 is provided at the inner end of the frame 1 and the latter is provided with an outer stem 3 and an inner stem 4 to which the saw blade 5 is attached by cotter pins 6, the inner ends of the stems being enlarged and formed with kerfs to receive the ends of the saw blade. The enlargements at the inner end of the stems 3 and 4 preferably consist of sleeves snugly fitted thereon and riveted thereto and acting as stops to limit the outward movement of the stems. The stem 3 has a head 8 at its outer end in the sides of which are formed grooves 9 which receive lugs 10 of the saw frame, whereby to hold the stem 3 in the required adjusted position. The lugs 10 project outwardly from the sleeve or guide at the outer end of the frame 1 in which the stem 3 is rotatably and slidably mounted.

The inner stem 4 is rotatably and slidably mounted in a sleeve or guide at the inner end of the saw frame and receives a collar 11 which is splined thereto, said collar having a lug 12 adapted to coact with notches 13, whereby to hold the stem in the required adjusted position. A thumb nut 14 threaded upon the stem 4 serves as means for tensioning the saw blade 5 and securing the stems 3 and 4 in the required adjusted position. When it is required to adjust the saw blade 5 angularly, the thumb nut 14 is backed a distance to admit of the lug 12 clearing the notches 13 and the lugs 10 clearing the grooves 9, whereby both stems 3 and 4 may be turned to bring the saw blade 5 in the required adjusted position, said blade being made secure by tightening the thumb nut 14 whereby the lug 12 engages the selected notch 13 and the lugs 10 engage the selected grooves 9.

Transversely spaced plates 15 project outwardly from the rear end of the saw frame 1 and terminate in lateral flanges 16. Slots 17 are formed in the plates 15 in coincident position and receive a slide 18 through which a threaded stem 19 passes and receives a nut 20. A finger piece 21 projects laterally from the outer end of the stem 19 and operates to secure or release the handle 2. The shank of the handle 2 is recessed and plates 22 secured to opposite sides of the shank portion of the handle have inner flanges 23 at their forward ends which engage the end of the handle. An expansible helical spring 24 is mounted upon the stem 19 and at one end abuts the handle 2 and serves normally to yieldably hold the handle 2 against the rear end of the saw frame 1. A disk or circular plate 25 attached to the end of the handle 2, receives the stem 19 and is provided with lugs 26 which engage the outer edges of the flanges 16 and come between the plates 15, whereby to secure the handle 2 in the required adjusted position. A longitudinal slot 27 is formed in one of the plates 22 and a transverse slot 28 is in communication with the outer end of the slot 27. The finger piece 21 is operable in the slots 27 and 28 and when disposed in the latter secures the handle 2 in the required adjusted position. When the finger piece 21 is moved to register with the longitudinal slot 27, the handle 2 may be drawn outwardly to cause the lugs 26 to clear the plates 15 and flanges 16, when the handle may be turned to any required angular position. It is also observed that the handle may be moved transversely by reason of the slots 17 to bring it near to or farther away from the line of the saw blade 5. The handle is made secure in the required adjusted position by entering the finger piece 21 in the lateral slot 28.

What is claimed is:

1. In a hack saw, a saw frame, transversely spaced plates projecting rearwardly from the saw frame and terminating in lateral flanges, said plates having coinciding slots, an adjustable handle, lugs at the end of the handle to be disposed between said flanged plates to secure the handle in the required adjusted position, a stem forming connecting means between the saw frame and handle, a slide mounted upon the stem and operable in the slots of the flanged plates, and means coacting with the stem for securing the handle in the required adjusted position by preventing casual displacement of said lugs from between said plates.

2. In a device of the class described, a pair of transversely spaced plates, an angularly adjustable scroll handle, a stem forming connecting means between said plates and handle, said handle provided with an opening, a coil spring surrounding said stem within the opening and bearing at one end against a portion of the handle and bearing at its other end against a shoulder on said stem, lugs at the inner end of said handle and spaced about said stem, said lugs selectively disposable between said plates and being yieldingly held in desired position by said spring and serving to prevent casual turning movement of the handle on the stem and relative to the plates, said handle shiftable to bring a second of said lugs into position between said plates by a longitudinal movement of the handle in opposition to the spring followed by a turning movement of the handle, and means associated with said stem and handle disposable to prevent longitudinal movement of the handle relative to the plates and the stem.

3. In a device of the class described, a pair of transversely spaced plates, said plates having coinciding slots, an adjustable scroll handle, a stem forming connecting means between said plates and said handle and having a portion disposed in the space between the former, said handle provided with an opening and having a longitudinally and transversely extending slot communicating with said opening, a slide adjustably mounted upon the stem and operable in the slot in the transversely spaced plates and providing for adjustment of the handle in the plane of the saw and toward and away from the saw, a finger piece mounted on said stem within said opening and projecting through the slot communicating with the opening, a coil spring surrounding said stem within the opening and bearing at its forward end against said handle and bearing at its rearward end against a portion of said finger piece and normally urging said handle toward said plates, lugs at the inner end of said handle and spaced about said stem, said lugs selectively disposable between said plates to prevent relative turning movement of the plates and handle, said spring yieldingly holding said plates and handle together and maintaining the selected lugs in place between said plates, said handle shiftable to bring a second of said lugs into position between said plates by longitudinal movement of the handle relative to the plates and in opposition to the spring followed by a turning movement of the handle about the stem as a pivot, and said finger piece adapted to be so positioned in the longitudinally and transversely extending slot that longitudinal movement of the handle relative to the plates will be prevented.

4. In a device of the class described, a pair of spaced plates having oppositely disposed flanges formed at their inner ends, a stem having a portion disposed between said plates and projecting beyond the flanged end thereof, said stem connected to said plates, a handle having an opening into which said stem projects, a coil spring surrounding said stem within said opening and bearing at its forward end against a portion of the handle and bearing at its rearward end against an abutment on the stem and normally urging the handle toward the plates, a disk secured to the inner end of said handle, lugs spaced about the forward face of said disk, said lugs arranged in pairs and one pair of lugs adapted to be positioned between said spaced plates with the other pair of lugs engaging the outer edges of the flanges of the plates to prevent turning movement of the handle relative to the plates, said handle adapted to be moved away from said plates in opposition to said coil spring to permit of turning movement of the handle about the stem to change the position of the handle relative to the stem.

5. In a saw, a scroll handle adjustable angularly with respect to the saw, means securing the handle to the saw against casual turning movement with respect thereto, a spring normally urging said handle toward said saw and maintaining the securing means in active position, said handle adapted to be moved away from said saw in opposition to said spring to render said means ineffective, said handle adapted in its last named position for turning movement relative to the saw to effect the desired adjustment of the handle, said handle after being adjusted adapted to be returned by said spring toward the saw, and other means adapted to be brought into active position by the turning movement of said handle, and adapted to prevent casual turning movement of the handle from its adjusted position, said last named means being assisted by said spring.

6. In a saw, a scroll handle adjustable angularly with respect to the saw, means securing the handle to the saw against casual turning movement with respect thereto, a spring normally maintaining said means in active position, said means adapted to be moved away from said saw, in opposition to the spring to render the means ineffective, said handle adapted when said means is in its last named position for turning movement relative to the saw to effect the desired adjustment of the handle, said means after the handle is adjusted adapted to be returned by said spring toward the saw, and other means adapted to be brought into active position by the turning movement of the handle, and adapted to prevent casual turning movement of the handle from its adjusted position, said last named means being assisted by said spring.

In a testimony whereof I affix my signature in presence of two witnesses.

JAMES O. REYNOLDS.

Witnesses:
   PAUL S. ANDREWS,
   LUCIAN ANDREWS.